United States Patent Office 3,644,567
Patented Feb. 22, 1972

3,644,567
PROCESS FOR PREPARING BLOCK COPOLYMERS FROM A TETRAHYDROFURAN POLYMER
Samuel Smith, Roseville, and Allen J. Hubin, White Bear Lake, Minn., assignors to Minnesota Mining and Manufacturing Company, St. Paul, Minn.
No Drawing. Original application Feb. 10, 1966, Ser. No. 527,399. Divided and this application June 23, 1970, Ser. No. 59,768
Int. Cl. C08g 39/00
U.S. Cl. 260—829
6 Claims

ABSTRACT OF THE DISCLOSURE

Block copolymers are prepared by polymerizing a cationically polymerizable monomer with polycationically polymer of a tetrahydrofuran. In an example, 10 ml. of tetrahydrofuran and 0.5 ml. of trifluoromethane sulfonic anhydride were reacted at room temperature to produce a dicationically active polytetrahydrofuran. Ethylene oxide was polymerized onto the ends of the tetrahydrofuran polymer at room temperature, and the block copolymer product then was quenched in dilute aqueous sodium hydroxide for 70 hours and was washed with water containing sodium bromide.

---

This application is a division of United States patent application Ser. No. 527,399 filed on Feb. 10, 1966.

This invention relates to new polymeric materials having unique reactivity of a poly-cationic nature. In one aspect this invention relates to polymers having high reactivity as alkylating or acrylating agents, as reflected by their ability to engage in electrophilic displacement reactions with various compounds. In still another aspect this invention relates to a method for the preparation of new polymeric materials, including block copolymers, polymeric polyamines, polymeric polythiols, polymeric polyisocyanates, bisphenols containing a polymeric bridge, and other polymeric derivatives.

In the polymer field considerable effort has been expended in an attempt to provide polymeric materials having a high degree of reactivity. Such reactivity is particularly desirable to permit modification of physical and chemical properties, e.g. to improve the adhesion of the polymer to metals and glass, to carry out further chemical reactions such as simple substitution, crosslinking, chain extension, graft and block copolymerization, etc. These efforts to achieve the desired reactivity in the polymer molecule have met with only limited success. The preparation of reactive polymers having an anionic character has recently been reported, and the term "living polymers" has been ascribed to such polymers, as noted by M. Szware et al. in the Journal of the American Chemical Society, vol. 78, page 2656 (1956). Polymers having such "living" character behave as though they are contaminated.

The present invention provides "living polymers" of a poly-cationic nature which are quite stable in the presence of oxygen, as contrasted to the anionic "living polymers," which tend to add oxygen in the presence of air and thus lose their "living" character. Another important distinct between cationic and anionic "living polymers" is the ability of the former to polymerize further in the presence of certain cationically polymerizable monomers. The cationic and anionic "living polymers" differ markedly in their reaction with compounds containing active (i.e. Zerewitinoff) hydrogen atoms. "Living polymers" of an anionic nature attack such compounds in a nucleophilic manner, i.e. a proton is transferred to the polymer to form an inactive, non-functional polymer, whereas the cationic "living polymers" attack such compounds in an electrophilic manner to produce macromolecules containing functional substituents and a free proton. This important distinction is evidenced by the reaction of the respective "living polymers" with ammonia. If "living polymers" of anionic character react at all with ammonia, they form the protonated, non-functional polymer plus the free amide ion; whereas the cationic "living polymers" of this invention react with ammonia to form the functional polymeric amine or amide plus a free proton. The reaction of the "living polymers" of this invention with ammonia (or amines) is a remarkably facile reaction proceeding at temperatures usually below 25° C. and at atmospheric pressure to give quantitative conversion to the alkylated or acylated amines. Thus, the poly-cationically active polymers are distinguished by their alkylating and acylating ability.

It is therefore an object of this invention to provide new and useful polymers, particularly polymers having a high degree of poly-cationic activity.

Another object of this invention is to provide polymeric alkylating and acylating agents.

Still another object of this invention is to provide a method for the preparation of polymers having "living" characteristics from cationically polymerizable monomers and for the preparation of derivatives thereof.

A further object of this invention is to prepare poly-cationically active polymers from preformed polymers.

Yet another object of this invention is to provide novel functionally substituted polymers.

It is also an object of this invention to provide methods for the preparation of block copolymers and resins useful in the preparation of tough chain extended and cured products.

Other objects and advantages of this invention, as well as the characteristics of the polymers and processes of this invention, will be apparent from the following description and examples.

In accordance with this invention applicants have provided substantially linear poly-cationically active polymers. The poly-cationically active polymers are characterized by their reactivity with ammonia which, when at least a two-fold molar excess of ammonia and a temperature of 25° C. or lower is employed, proceeds rapidly to produce polymeric polyprimary polyamines or polyamides in which the indicated functional groups are appended to terminal positions of the polymer chain. These terminally poly-cationically active polymers may also be characterized by their ability to initiate the polymerization of tetrahydrofuran monomer at 25° C., as evidenced by an increase in the molecular weight of the polymer resulting from the attachment of recurring oxytetramethylene groups to each end of the original poly-cationically active polymer.

The substantially linear poly-cationically active polymers of this invention can be prepared by two general methods. The first method involves direct conversion of monomer to a di-cationically active polymer, using certain catalysts as hereinafter defined. In a second method, preformed polymers in the 400 to 100,000 molecular weight range and having certain functional groupings are converted to poly-cationically active polymers, as hereinafter described. In general, the direct conversion process leads to the formation of an essentially linear, di-cationically active polymer, while the indirect conversion process can lead to the formation of either linear, di-cationically active or branched poly-cationically active polymers, depending upon the state of branching and terminal group functionality of the preformed polymer. By "substantially linear polymer" is meant a relatively long chain polymer which may have substituent groups attached to the main polymer chain but such substituent groups are generally of substantially lesser chain length than the main chain, normally less than half of the length of the main chain.

Direct preparation of di-cationically active polymers

Certain acid polymerizable (i.e. cationically polymerizable) monomers may be converted directly to substantially linear di-cationically active polymers. Tetrahydrofuran and sym-trioxane are preferred monomers in this respect. Tetrahydrofuran provides a di-cationically active polyether having recurring oxytetramethylene groups and is particularly preferred. Di-cationically active polyether copolymers can be prepared, for example, from tetrahydrofuran or sym-trioxane and a minor amount (e.g. less than 50 mole percent) of another acid polymerizable or copolymerizable cyclic ether (including cyclic thioether) e.g. propylene oxide, ethylene oxide, glycidyl methacrylate, styrene oxide, ethylene sulfide, propylene sulfide, epichlorohydrin, etc. The use of a different cyclic ether comonomer in the tetrahydrofuran system is frequently desirable to lower the melting point of the di-cationically active polyethers, as well as to improve the low temperature flexibility of derivatives prepared therefrom, as by curing the derivative polyether diamines with an epoxy resin having more than one oxirane group per molecule.

The polymerization of tetrahydrofuran monomer alone or in admixture with another acid polymerizable cyclic ether monomer must be carried out in the presence of certain catalysts. These catalyst molecules can conveniently be considered to consist of two components. Although some catalyst molecules are dissociable, it should be appreciated that not all useful catalysts ncessarily dissociate to any discernible degree. For example, it has been found that one mole of $CF_3SO_2$—O—$O_2SCF_3$, a non-conductive compound suitable for use as catalyst, when added to about 10 moles of tetrahydrofuran (which is also non-conductive) at room temperature produces a solution having high electrical conductivity. Accordingly, the polymerization of tetrahydrofuran with or without additional cyclic ether monomer may be considered to be initiated by a heterolytic cleavage of the catalyst molecule to produce a first component which rapidly adds to the oxygen atom of tetrahydrofuran to form a complex cation and a second component or anion. Although the specific mechanism of operation is not fully understood, it is believed that a hypothesis suggesting ionic components within the catalyst class is consistent with the well-known cationic mechanism of tetrahydrofuran polymerization. Reference herein to the two components of the catalyst molecule is intended to identify those portions of the molecule which serve as the cation and anion donors, respectively, during the initiation of tetrahydrofuran polymerization.

A first class of useful catalysts can be represented by the formula DQ. Q corresponds to a radical which, in anionic form, is a non-terminating anion in the polymerization of tetrahydrofuran, i.e. it does not terminate the growing polytetramethylene oxide chain. The radical D corresponds to the residue remaining after deletion of a hydroxyl group from a monobasic acid (hereinafter referred to as "catalyst parent acid") which is stronger than 100% sulfuric acid and which is also an acid capable of effecting the cationic polymerization of tetrahydrofuran. The ability of a strong acid to polymerize tetrahydrofuran can be readily determined. Such a strong acid may be mixed with tetrahydrofuran (0.02 mol acid/ 1 mol tetrahydrofuran) and allowed to react at 25° C. A yield of polytetrahydrofuran greater than 50% after one week indicates that the strong acid is a suitable catalyst parent acid.

The cationic polymerization of tetrahydrofuran using acid catalysts has been reported in the literature, and accordingly the evaluation of various monobasic acids for their utility in such polymerization need not be discussed in great detail. Acids which are effective tetrahydrofuran polymerization catalysts include $FSO_3H$, $ClSO_3H$, $HClO_4$, $HIO_3$, $CF_3SO_3H$, $C_4F_9SO_3H$, etc. and the corresponding D radicals derived therefrom are $FSO_2$—, $ClSO_2$—, $ClO_3$—, $IO_2$—, $CF_3SO_2$—, $C_4F_9SO_2$—, etc. Moreover the catalyst parent acid must be one which exhibits essentially no chain transfer activity in the polymerization of tetrahydrofuran. Accordingly chlorosulfonic acid is not a suitable catalyst parent acid because of its ability to transfer chloride ion to growing polytetrahydrofuran chains under normal conditions and to append chlorine chain terminating groups (see J. Furakawa and T. Saegusa "Polymerization of Aldehydes and Oxides" Page 232, Interscience Publishers, New York, 1963). As a result, $ClSO_2$— is not a useful D component of the catalyst molecule when polymerization temperature in excess of about −10° C. are employed. At lower temperatures the chain transfer activity of catalysts containing $ClSO_2$— radicals is suppressed to the point where such catalysts can be quite useful for producing substantially linear di-cationically active polyethers. Radicals preferred as D components include: $FSO_2$—, $ClO_3$— and $R_fSO_2$—, where $R_f$ is a polyfluoroaliphatic radical as hereinafter defined, e.g. $CF_3SO_2$—, etc.

The Q component of this class of catalysts employed in the preparation of di-cationically active polymers corresponds to a radical which, in anionic form, is a non-terminating anion in the polymerization of tetrahydrofuran, i.e. it does not terminate the polymerization of tetrahydrofuran. It has been well-established that the heretofore known polymerization of tetrahydrofuran always involves a cationic mechanism, i.e. the growing polymer chain contains a single cationically active end group, and the ability of the polymer to add further monomer and increase in molecular weight depends upon the maintenance of a single cationically charged site. Many anions react with this charged site to bring about chain termination by a charge neutralization reaction involving either a coupling reaction in which the anion (e.g. $Cl^-$, $Br^-$, $NO_3^-$, $CN^-$, $CH_3CO_2^-$, $CH_3SO_3^-$, etc.) combines directly with the polyether cation to form an electrically neutral compound, or a transfer reaction in which a portion of the complex anion is transferred, usually as a halide ion, to form both a neutral polyether molecule and also either a neutral compound derived from the original anion or a new anion of lower electrical charge than the original anion. Examples of the latter type are $ClSO_3^-$ and the complex anions derived from relatively weak Lewis acids such as $TiCl_4$, $ZnI_2$, $SiF_4$ and $SeBr_4$. A distinguishing feature of the present invention, as it applies to the direct conversion of monomer to a di-cationically active polymer, is the fact that polymerization ensues simultaneously at the opposite ends of the substantially linear growing polymer chain.

One particularly useful class of non-terminating anions or Q radicals are those derived from extremely strong protonic acids, such as $FSO_3^-$, $ClO_4^-$ and $R_fSO_3^-$, where $R_f$ is a polyfluoroaliphatic (including polyfluorocyclic aliphatic) radical containing from 1 to 18 carbon atoms and at least one fluorine substituent on the alpha carbon atom. $R_f$ may also contain hydrogen and other halogen atoms, such as chlorine, in addition to fluorine and may be interrupted by either oxygen or amine nitrogen atoms, provided such oxygen or nitrogen is vicinal to a fluorine substituted carbon atom. Preferably $R_f$ is at least half fluorinated, i.e. at least about half of the monovalent atoms appended to the carbon atoms of the $R_f$ group ae fluorine. For example, $R_f$ may be perfluoroalkyl (see U.S. 2,732,398), perfluorocycloaliphatic, betahydroperfluoroalkyl (see U.S. 2,403,207), omega - chloroperfluoroalkyl (see U.S. 2,877,267), $H(CX_2CX_2)_n^-$ wherein two X's attached to one carbon atom are fluorine and the remaining X's are either hydrogen or a halogen (e.g. chlorine, fluorine), etc. Illustrative $R_f$ groups include trifluoromethyl, pentafluoroethyl, heptadecafluorooctyl, undecafluorocyclohexyl, 1,1,2,2-tetrafluoroethyl, 2-hydro-hexafluoropropyl, 1,1-difluoroethyl, 1,1-difluoro-2,2-dichloroethyl, 8-chloro-perfluorooctyl, etc.

Another class of useful non-terminating anions or Q radicals are the complexes derived from very strong Lewis acids, e.g. $BF_3$, $SbF_5$, $SbCl_5$, $AsF_5$ and $PF_5$. Examples of such non-terminating anions are $BF_4^-$, $SbF_6^-$, $SbF_5(O_3SF)^-$, $SbCl_6^-$, $AsF_6^-$, and $PF_6^-$.

A general method which can be used to determine whether a specific anion is terminating or non-terminating, as used herein, is to conduct the cationic polymerization of tetrahydrofuran in a conventional manner using a known acid catalyst, but with the addition to the polymerization system of a soluble salt containing that anion, thus investigating the effect of that anion on the polymerization reaction. For example, tetrahydrofuran monomer and a small amount (e.g. one mol percent of total monomer) of ethylene oxide can be polymerized by using 2 mole percent (based on total monomer) of boron trifluoride as the polymerization initiator under temperature conditions capable of providing of at least about 50% conversion of monomer to polymer, e.g. 20° C. If the same reaction is performed with the addition of 2 mole percent of a dissolved salt containing the anion in question, any significant decrease in the extent of conversion and/or in the molecular weight of the product formed demonstrates that the anion is a terminating species. Thus, lithium bromide, lithium nitrate, silver trifluoroacetate and silver cyanide cause reductions in conversions so that no more than 10% of polymer is produced, providing that $Br^-$, $NO_3^-$, $CF_3CO_2^-$ and $CN^-$ are terminating anions. On the other hand, when identical reactions are performed in the presence of silver perchlorate, silver trifluoromethane sulfonate, lithium hexafluorophosphate and silver hexafluoroantimonate, no significant effects on either the amount of polyether produced or its molecular weight are noted, thus proving that $ClO_4^-$, $CF_3SO_3^-$, $PF_6^-$, and $SbF_6^-$ are non-terminating anions.

Anhydrides which are effective catalysts having the formula DQ include pyrosulfuryl fluoride, i.e. $(FSO_2)_2O$ (where $FSO_2$— and $FSO_3$— may be considered to be D and Q, respectively) $(CF_3SO_2)_2O$ ($CF_3SO_2$— and $CF_3SO_3$—) and $Cl_2O_7$ ($ClO_3$— and $ClO_4$), as well as their mixed anhydrides, such as $FSO_2$—O—$O_2SCF_3$. Salts which are effective catalysts for producing the di-cationically active polyethers of this invention include $FSO_2F \cdot PF_5$, $CF_3SO_2F \cdot SbF_5$, $CF_3SO_2Cl \cdot SbCl_5$ and $ClO_3F \cdot BF_3$, which may be considered to be $FSO_2^+PF_6^-$, $CF_3SO_2^+SbF_6^-$, $CF_3SO_2^+SbCl_6^-$ and $ClO_3^+BF_4^-$, respectively. Such salts may frequently be most conveniently prepared by the direct reaction of the acid halide with the appropriate Lewis acid.

A second catalyst class which is effective in producing the di-cationically active ethers of this invention by a direct conversion of monomers is the class of certain diesters of the abovementioned catalyst parent acid, i.e. fluorosulfonic acid, polyfluoroaliphatic sulfonic acids (i.e. $R_fSO_3H$) and perchloric acid, and a diprimary glycol. This class may be represented by the formula $DZCH_2(A)_nCH_2ZD$, where D is as defined earlier and is preferably a fluorosulfonate, polyfluoroaliphatic sulfonate (e.g. $R_fSO_3^-$) or perchlorate radical, A is a difunctional organic radical which is devoid of acetylenic and olefinic unsaturation and free of alkylatable groups containing Zerewitinoff hydrogen atoms (e.g. hydroxyl, amino, thiol and carboxylic acid groups), preferably an alkylene, oxyalkylene or recurring oxyalkylene radical, Z is oxygen or sulfur, and $n$ is 0 or 1. Particularly preferred catalysts of this class are: 1,4-butane bis(fluorosulfonate), 1,4-butane bis(trifluoromethane sulfonate) and the corresponding esters of poly(tetramethylene) glycol. These compounds are conveniently prepared by a direct method which involves the reaction of either pyrosulfuryl fluoride (fluoosulfonic anhydride) or trifluoromethane sulfonic anhydride with tetrahydrofuran. When stoichiometric concentrations of either of these anhydrides and tetrahydrofuran are reacted at $-30°$ C. to $0°$ C. the 1,4-butane diester is obtained in good yield. When excess tetrahydrofuran is used in this reaction, the resulting diester contains recurring oxytetramethylene groups and the average molecular weight of the product varies essentially directly with the molar excess of tetrahydrofuran employed.

Considerable latitude is permissible in the selection of conditions for the direct polymerization reaction. However, it is important that these reactions be conducted in a system which is relatively free of chain terminating agents. As used herein, the term "chain termination" connotes a chemical reaction during polymerization in which a cationically charged end of a polymer chain is effectively neutralized and a terminal group having essentially no further alkylatability under the conditions of polymerization is appended to the formerly cationically charged end portion of the polymer chain. Polymerization in accordance with this invention proceeds to give a product in which substantially all chain ends are cationically active. The presence of chain terminating agents (i.e. compounds which are only monoalkylatable under the selected reaction conditions, including soluble halide salts, acyl halides, alcohols, acids and anhydrides substantially weaker than fluorosulfonic acid, etc.) which are alkylated by the cationically active ends of the polymer chain introduces a substantial number of inert end groups which prevent further chain propagation. It should be understood that some materials normally considered as chain terminating agents for polymerization reactions other than those described herein are not objectionable under some polymerization conditions in the present invention. In particular, polyalkylatable compounds, e.g. compounds having two or more active hydrogen atoms such as water, alkylene or polyalkylene ether glycols, etc. can react with two cationically charged polymer chain ends and thus can serve as chain extending agents. Water can react with a di-cationically active polymer to produce a mono-cationically active polymer with one hydroxyl group, and the hydroxyl group of this product can be readily alkaylated by another di-cationically active polymer to form a new di-cationically active polymer of increased chain length. This tolerance to water in the polymerization system of this invention is very advantageous from an economic standpoint. Accordingly, polyalkylatable compounds, in amounts up to about stoichiometric equivalence with the catalyst concentration, are not necessarily objectionable in the preparation of di-cationically active polymers.

Although the use of a solvent is often not essential, an inert solvent may be desirable to moderate the rate of reaction or to permit easier handling of the reaction mixture. Suitable solvents include methylene chloride, fluorohalocarbons, cycloalkanes (e.g. cyclohexane), etc. The temperature in these reactions is generally in the range of $-40°$ C. to $+70°$ C. when tetrahydrofuran is employed, although temperatures up to about 100° C. can be used with other monomers, such as sym-trioxane. When solvents are employed it is normally desirable to conduct the reactions at lower temperatures, e.g. $-20°$ C. to $+40°$ C., and to maintain solvent concentration below about 40% by weight.

The molecular weight of the resulting polymers can vary over wide limits, e.g. from about 400 to 1,000,000 and higher. An effective method for controlling the molecular weight is provided by regulating the molar concentration ratio of catalyst to monomer. When higher molecular weights are desired, the above mol ratio is preferably between about 0.001 and 0.01, the lower molecular weights generally being obtained with a mol ratio between about 0.01 and 0.5.

Indirect preparation of terminally poly-cationically active polymers

Although the direct method of preparation of the dicationically active polymers of this invention is extremely useful, it is generally limited to certain cationically polymerizable monomers, as explained previously. Considerable versatility is provided by an indirect method of preparing a terminally polycationically active polymer which utilizes as a starting material a preformed polymer (i.e. prepolymer) which has certain functional substituents only in terminal positions and which is otherwise free of alkylatable groupings (e.g. olefin, amine, hydroxyl, thiol, carboxylic acid, etc.). Appropriate prepolymers can be classified in two categories:

(I) Polymers containing —OH or —SH (or the alkali metal salts thereof), —COOH or —$SO_3H$ terminal groups can be converted to terminally poly-cationically active polymers by reaction with either a non-terminating catalyst parent acid, or certain derivatives thereof as specified below, wherein the catalyst parent acid is capable of initiating the cationic polymerization of tetrahydrofuran per se. Specifically, the terminally poly-cationically active polymers may be prepared by reacting the above-mentioned prepolymer with a catalyst parent acid, its anhydride, its acyl halide or an alkylene biester of the structure $$DZ-CH_2-(A)_n-CH_2-ZD$$

where D, Z and A are as hereinabove defined. Illustrative of these catalyst parent acids and their derivatives are $FSO_3H$, $(FSO_2)_2O$, $FSO_3$—$C_4H_8$—$O_3SF$, $CF_3SO_3H$,

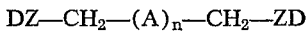

$HClO_4$, $Cl_2O_7$, $ClO_4$—$C_4H_8$—$O_4Cl$, etc. These conversion reactions to form the terminally poly-cationically active polymers are condensation reactions in which either a salt, water, a hydrogen halide or an acid (i.e. catalyst parent acid or the derivative) is produced as a by-product, depending upon the derivative used to convert the prepolymer to its cationically active state. Such condensation reactions are accomplished in a manner well known in the field of polymer modification. It is often desirable to employ a dehydrating agent or an acid acceptor in the reaction, usually in stoichiometric amount, or as a solid heterogeneous phase, to inactivate the by-product. The resulting terminally poly-cationically active polymers may be considered to be polyesters, polythioesters or polymixed anhydrides. They are characterized by their ability to initiate tetrahydrofuran polymerization, thereby forming block copolymers, as well as by their remarkable alkylating or acylating ability. The terminally polycationically active polymeric products derived from polymeric polyols and polythiols (or the corresponding alkali metal salts) are excellent alkylating agents, as are also the products formed by the reaction of the above-mentioned alkylene biesters with polymeric polycarboxylic or polysulfonic acids. The terminally polycationically active polymers derived from the reaction of polymeric polycarboxylic acids, and anhydrides or their acyl halides are mixed anhydrides which possess remarkable activity as acylating agents.

(II) Polymers containing acyl (i.e. carbonyl or sulfonyl) halide terminal groups, preferably acyl chloride or acyl bromide end groups, may be converted to polymeric mixed anhydrides by reaction with a non-terminating acid (i.e. catalyst parent acid) capable of initiating the polymerization of tetrahydrofuran, or a salt thereof, preferably a silver salt thereof. Illustrative reactants for the preparation of terminally poly-cationically active polymers form the abovementioned prepolymers include $FSO_3Ag$, $CF_3SO_3H$, $CF_3SO_3Ag$, $HClO_4$ and $AgClO_4$.

Prepolymer reactants having two or more terminal reactive groups which are suitable for the preparation of cationically active polymeric compounds by the indirect process can be provided by various means. Polymers containing terminal hydroxyl groups are well known. Several polyethers containing two terminal hydroxyl groups are readily available commercial materials, including polyethers derived from ethylene oxide, propylene oxide and tetrahydrofuran in a variety of molecular weights. Polyoxy methylene polymers containing hydroxyl end groups are also obtained from the ionic polymerization of formaldehyde or sym-trioxane. Branched chain polyethers containing more than two terminal hydroxyl groups may be prepared by polymerizing ethylene oxide in the presence of a basic catalyst and a polyol containing more than two hydroxyl groups. Thus, the use of trimethylolpropane or pentaerythritol as a reactant in ethylene oxide polymerization produces a branched polyether containing three of four terminal hydroxyl groups, respectively. When such branched materials are utilized as the prepolymer, the resulting products have a terminal cationic activity greater than 2.

Polyesters containing hydroxyl end groups have been prepared by using an excess of polyol monomer in the condensation reaction with a dicarboxylic acid. The molecular weights of such polyesters are controlled by regulating the degree of conversion of the monomers and the excess of polyol employed.

Hydroxyl terminated vinyl polymers derived from ethylenically unsaturated monomers have been prepared by the use of a suitable free radical initiator, such as hydrogen peroxide.

Methods for the preparation of thiol terminated polymers are also known. Thiol terminated polymers may be prepared by the addition of a slight excess of hydrogen sulfide or alkylene dithiols to alkylene bisesters of acrylic and methacrylic acid, as disclosed in U.S. Ser. No. 779,846, filed Dec. 12, 1958. A second process for providing dithiol terminated polymers involves the condensation of certain organic dihalides with a slight excess of sodium sulfide or polysulfide. Still another process for preparing thiol terminated polymers involves the esterification of carboxyl terminated polymers with mercaptoethanol.

Polyesters or poly-N-alkyl amides containing terminal carboxylic acid (or sulfonic acid) groups can be made by condensing a slight excess of an appropriate dicarboxylic acid (or disulfonic acid) with a polyol or polysecondary amine, respectively. Monomers which are capable of polymerizing on treatment with a dilithio-organic compound (e.g. styrene polymerized using 1,2-diphenyl-1,2-dilithioethane as catalyst) yield polymeric dicarboxylic acids or disulfonic acids on treatment with carbon dioxide or with sulfur dioxide and an oxidizing agent, respectively.

Acyl halide terminal groups (i.e. carbonyl and sulfonyl halide groups) on polymers may be provided by various means. In one case, polymers containing free acid groups may be converted to the desired prepolymer derivatives by reaction with phosphorus pentachloride or thionyl chloride or bromide. The use of a slight excess of an alkylene or arylene diacyl chloride (e.g. adipyl chloride, terephthalyl chloride or p,p'-diphenyl disulfonyl chloride) provides an opportunity for making polyesters or polyamides containing terminal acyl, e.g. sulfonyl halide groups. The reaction of excess phosgene with polymers containing alcohol groups affords still another method of introducing terminal acyl halide groups into the prepolymer, in this case chloroformate groups.

Normally wide latitude is available in the selection of reaction conditions to be employed in the indirect process for preparing the cationically active polymers. When uncrosslinked, terminally soluble poly-cationically active polymers are desired, e.g. for reactive intermediates for subsequent chemical modification, it is normally desirable to employ a prepolymer having a molecular weight of about 400 to 20,000 and containing the requisite functional groups in terminal positions on a linear or branched chain. The use of an approximately one to five-fold stoichiometric concentration of catalyst parent acid or derivative thereof to react with said functional groups is normally preferred for the preparation of an uncrosslinked product. When an acid acceptor is desired, the prepolymer may first be mixed with a teritary amine, e.g. triethylamine, in a concentration which is just sufficient to neutralize the acid formed by the reaction (when a prepolymer containing terminal alkali metal alkoxide or mercaptide groups is employed, it is usually unnecessary to use any additional acid acceptor). Selection of reaction temperature is normally not critical, and a preferred range of —8° C. to 100° C. may be employed, although the reaction rate at the lower temperatures may be undesirably slow. Inert, anhydrous solvents are frequently used in this indirect process, and suitable solvents have already been discussed.

The preformed polymeric reactant may contain situated along the chain various groups other than as specified above, provided these are inert to the action of the catalyst parent acid derivative used in the reaction and to the alkylation or acylating activity of the resulting poly-cationically active polymer. Thus, groups such as ester, ether, nitro and halo can be present in the polymer without interfering with the preparation of poly-cationically active polymers made by the indirect process.

From the foregoing description it is evident that a great number of preformed polymers containing suitable terminal functional groups can be used to prepare the cationically active polymers of this invention, including such suitable preformed polymers as polymeric materials based on styrene, vinyl chloride, vinyl alkyl ethers, esters of acrylic and methacrylic acid, vinyl esters, and polymers such as polyesters, polyethers, etc.

Reactions of poly-cationically active polymers

As mentioned earlier, the poly-cationically active polymers of this invention are remarkably effective alkylating or acylating agents and, indeed, may be characterized by their alkylating or acylating ability. In addition, they serve as effective polymeric initiators for the further polymerization of acid polymerizable monomers, the products of which are block copolymers. Many other useful products can be derived from these poly-cationically active polymers as intermediates, taking advantage of the strongly electrophilic nature of these macromolecules.

Inorganic and organic compounds (including polymeric materials) containing active hydrogen, particularly compounds with —OH,

—SH, —SO$_3$H, and —NHR' groups (R' is hydrogen, alkyl or aryl), readily react with the poly-cationically active polymers of this invention, these reactions being essentially alkylation or acylation reactions in which the polymer chain alkylates or acylates the electronegative group to which the active hydrogen is attached. Suitable active hydrogen containing compounds include water, hydrogen sulfide, ammonia, urea, hydrazine, aniline, methyl amine, mercaptoethanol, glycolic acid, polymers of acrylic acid, vinyl alcohol polymers, succinic acid, glycine, proteins, piperazine, triethylene tetramine, ethylene glycol, etc. The products of this alkylation or acylation reaction are thus the corresponding polymeric derivative and the catalyst parent acid. In many cases an acid acceptor is desirable to neutralize the strong catalyst parent acid product of the reaction. This neutralization is frequently necessary to avoid undesirable side reactions. In the alkylation or acylation of amino compounds, including amines and ammonia, an excess of amino compound may be used to neutralize the acid product. In instances where the reaction is rapid, e.g. the alkylation of an alkyl mercaptan, and acid acceptor such as pyridine can be used to advantage, preferably in stoichiometric amounts.

Reaction temperatures are generally not critical, and a range between about —80° C. to 150° C. has been found to be suitable, although the lower temperatures (e.g. below 25° C.) are generally preferred to moderate the rate of reaction. The use of an inert solvent is not always necessary and is, in some cases, undesirable. Suitable inert solvents have been discussed earlier. Control of reactant concentrations is important in alkylation and acylation reactions employing the cationically active polymers. The functionality of the reactants, the requirement of an acid acceptor and the desired end product should be considered in determining the optimum proportion of reactants, as will be apparent to those skilled in this art. The functionality of the compound to be alkylated or acylated is equivalent to the number of alkylatable or acylatable groups present in the molecule multiplied by the number of times that group can react with the cationically active sites on the polymer of this invention. For example, water has a functionality of two, since each water molecule is capable of reacting with two cationically active sites on the polymer. If water reacts with one cationically active site on the poly-cationic polymer, the product is a polymeric polyol; if the water reacts with two cationically active sites, the product is a polymeric polyether. Similarly, ammonia having a functionality of four can react with the poly-cationically active polymeric alkylating agent to produce a polymeric primary, secondary or tertiary amine, or a quaternary ammonium salt. If the polymeric primary amine is desired, therefore, a large excess of ammonia is preferably used, e.g. at least a five-fold stoichiometric excess.

The following is intended to clarify further the important effects of reactant functionalities and concentrations on the nature of the reaction products. If a compound having two active hydrogen atoms is reacted with a polymer containing two cationically active groups, the product is a chain extended linear polymer when the molar concentration ratio of the reactants is close to unity. When the compound containing two active hydrogen atoms is used in excess, preferably at least a two-fold stoichiometric excess, then the di-substituted polymeric product retaining functional groups is favored, and this technique provides a means for preparing low molecular weight polymeric dithiols or dicarboxylic acids using excess alkylene dithiols (or H$_2$S) or dicarboxylic acids, respectively. If a compound having three or more active hydrogen atoms is reacted with the di-cationically active polymer having two cationically active groups in approximately stoichiometric proportion, the principal poduct is a crosslinked polymer, the properties of which can be varied by appropriate selection of the reactants.

With a poly-cationically active polymer having more than two cationically active groups in terminal positions of a branched chain, the product of reaction with a compound having a single active hydrogen is a simple replacement product, while the product of its reaction with a compound having two or more active hydrogen atoms may provide a crosslinked polymer.

The poly-cationically active polymers of this invention also react with numerous metal salts (e.g. potassium cyanate, sodium phenolate, etc.) to effect a double decomposition reaction, the products being the polymer resulting from the alkylation of the salt anion by the cationically active polymer and the salt of the catalyst parent acid. Salts of alkali metals, e.g. lithium iodide, sodium cyanide, potassium cyanate, sodium bisulfide, sodium bisulfite, sodium hydroxide, monosodium adipate, disodium succinate, potassium acid phthalate, sodium phenoxide, etc. are preferred, particularly when very soluble in the reaction medium, although salts such as calcium hydroxide and silver cyanide can also be used. Such reactions may be conducted either in homogeneous solutions or in heterogeneous dispersions. These reactions are one preferred method for obtaining the desired derivative of the cationically active polymer, since the catalyst parent acid is not generated and an acid acceptor is not needed.

The above reaction of the poly-cationically active polymers of this invention with metallic salts is similar to the alkylation of compounds containing active hydrogen, discussed earlier, in that effects of reactant functionalities and concentrations on product structure apply here as well. Frequently one may use alternate processes for the preparation of the desired polyfunctionally terminated polymers. Thus one may prepare polytetramethyleneoxide containing primary amine end groups by use of any of the following methods: (A) Reaction of the di-cationically active polymer of tetrahydrofuran with excess ammonia as described previously; (B) Reaction with lithium azide followed by reduction of the resultant azide groups to the primary amines; (C) Reaction with lithium cyanide followed by hydrogenation of the terminal nitrile groups to primary amines; (D) Reaction with p-nitro sodium phenoxide followed by hydrogenation of the nitro groups to primary amines; (E) Reaction with lithium phthalimide followed by a subsequent reaction of the resulant imide groups with hydrazine to give the desired amines. Certain of these reactions can occasionally be used to great advantage when it is desired to avoid side reactions, e.g. polyalkylation which would occur normally to some small extent in the reaction of the poly-cationically active polymer with a compound containing several active hydrogens, e.g. ammonia. Thus if one desires a polymer containing amine groups only in the form of terminal primary amines, the lithium azide and phthalimide reactions shown above (B and E, respectively) will generally give better results than the reaction of the poly-cationically active polymer with ammonia.

The poly-cationically active polymers of this invention also react with those aromatic compounds capable of undergoing a Friedel-Crafts reaction to give the ring alkylated or acylated derivative. Benzene and many of its derivatives undergo this reaction. The ring alkylation of benzene is essentially complete in about 4 hours at 78° C. If electron-donating groups (e.g. alkyl, alkoxy, hydroxyl) are present on the ring, the reaction is greatly accelerated and the alkylation occurs primarily in the ortho- and para-ring positions. On the other hand, if electron-withdrawing groups (e.g. halo, nitro, trifluoromethyl) are present on the ring, the reaction is noticeably slowed. Indeed, p-dichlorobenzene, nitrobenzene and benzotrifluoride are sufficiently unreactive to be used as inert solvents for the reaction.

The alkylation and acylation of aromatic compounds which are capable of undergoing a Friedel-Crafts reaction using these poly-cationically active polymers leads to extremely valuable products and intermediates for chemical synthesis. Such aromatic compounds include benzene, toluene, mesitylene, ethyl benzene, phenol, anisole, naphthalene, fluorene, acenapthene, diphenyl, diphenyl ether, anthracene, dibenzofuran, etc. The introduction of aromatic groups onto the polymer chain provides an opportunity for subsequent chemical modification of the polymer, such as by chlorination, nitration, sulfonylation, polyetherification, and polyesterification reactions. In the alkylation of phenol it is noteworthy that the phenolic hydroxyl group appears to be much less subject to alkylation under acid conditions than the para-ring position, which is activated by the phenolic hydroxyl.

Compositions of matter based on aromatic compounds, particularly phenolic compounds, which have been alkylated or acylated with the cationically active polymers of this invention may be used to obtain flexible resins, e.g. phenolic resins, epoxy resin, polycarbonate resins, aminoaldehyde resins, etc. Such alkylated or acylated phenolic materials can also be used as intermediates in the organic syntheses of dyes, drugs, and other chemical compounds.

The poly-cationically active polymeric alkylating agents of this invention also alkylate by addition to compounds having localized electron-rich sites. This alkylation by addition is illustrated by their reaction with tertiary amines to yield the quaternary ammonium salt of the parent catalyst acid.

It is significant to note that in most of the foregoing description it is not necessary to prepare and isolate the polycationically active polymers of this invention as separate and distinct steps. Frequently the poly-cationically active polymers of this invention are intermediates in the preparation of high molecular weight polymers which are valuable per se, as is true in the preparation of polytetramethylene oxide from tetrahydrofuran. The use of the catalysts of this invention affords a very simple and economical means for preparing this extremely useful polymer from the monomer. However, the cationically active polymers most often find use as intermediates in graft or block copolymerization or in alkylation or acylation reactions, as already described. Where this is the case, it is frequently desirable to prepare the poly-cationically active polymer in situ and carry out the desired alkylating or acylating reactions either simultaneously with, or subsequent to, its formation.

The novel products and processes described herein find utility as useful materials in the preparation of plastic and protective coating compositions, elastomers, polymeric surface active agents, impregnants, binders, potting compositions, adhesives, fibers, tape backings, foams and films.

The following examples will illustrate the invention.

EXAMPLE 1

This example illustrates two extremely useful processes for making high molecular weight polytetramethylene oxide.

(A) 444 grams of anhydrous tetrahydrofuran was placed in a round bottom flask equipped with a stirrer and cooled to about $-30°$ C. in a Dry Ice bath before adding 0.9 gram of $(CF_3SO_2)_2O$. The mixture was allowed to warm with stirring to room temperature, and a continuous increase in viscosity was noted at this temperature. After several hours, the solution was too viscous to stir. The reactants were allowed to stand about 72 hours at room temperature. The di-cationically active product, then a non-flowing rubbery mass, was cut into small pieces and these were quenched in diluent aqueous NaOH overnight. Then, after being washed with water, the polymer was dissolved in tetrahydrofuran and reprecipitated in water. The yield of dried, off-white polymer was 336 grams, a conversion of nearly 76%. The molecular weight of the product was approximately 300,000 as estimated from the inherent viscosity of 2.48 in benzene at 25° C. In the unvulcanized state the polymer had a tensile strength of 5470 p.s.i. and an ultimate elongation of 650%. Low temperature properties were excellent, with a brittle point below $-80°$ C. This polyether was vulcanized using both a normal peroxide-sulfur, and a peroxide-divinyl benzene recipe to yield very tough, resilient elastomers with excellent water resistance. The unvulcanized product may be used in protective coatings, paint formulations, etc.

(B) One liter of tetrahydrofuran was distilled from LiAlH$_4$ into a two liter flask equipped with a stirrer. 0.5 ml. of pyrosulfuryl fluoride was added at room temperature. After stirring for a short period to homogenize the reactants, agitation was stopped and the materials were allowed to stand overnight. At the end of this time the reactants had been converted into a non-flowing, colorless mass which, except for a slight increase in rigidity, underwent no observable changes for five days. The polymer was then cut into pieces, quenched in dilute aqueous ammonia, dissolved in tetrahydrofuran, reprecipitated in water and dried. The resulting polymer was a hard, white, leathery material which had an inherent viscosity of 5.11 in benzene at 31.5° C. The product yield was 75 percent, and the calculated molecular weight was about 700,000. Coatings prepared from this high molecular weight polymer were very tough and abrasion resistant.

EXAMPLE 2

This example describes several reactions in which dicationically active polymers were used to alkylate ammonia and various primary amines.

(A) 275 ml. of anhydrous tetrahydrofuran was placed in a 500 ml. round bottom flask equipped with a stirrer. The flask was cooled to about −40° C. and 3 ml. of trifluoromethane sulfonic anhydride was added. On warming to room temperature an increase in viscosity was noted indicating that polymerization was taking place. When the solution was fairly viscous, ammonia gas was bubbled slowly through the solution of the di-cationically active polyether to maintain a relatively low concentration of ammonia. When the addition began there was an immediate reaction, as evidenced by a very rapid and abrupt viscosity increase of the solution. Ammonia addition was stopped when the reactants could no longer be satisfactorily stirred. The product was poured into dilute aqueous sodium hydroxide and heated with agitation on the steam bath. It was then washed with water and dried in a vacuum oven at 50° C.

The product (150 g.) was not completely soluble in benzene, whereas normal tetramethylene oxide polymer is completely soluble in benzene. It was soluble in methyl ethyl ketone, in which solvent it had an inherent viscosity of 0.402 corresponding to an approximate average molecular weight of 28,000. Elemental analysis gave 2.22% N, which corresponds to about 44 nitrogen atoms per viscosity average molecule. This branched chain polyether-polyamine product was curable to a very tough rubber having good adhesion to aluminum when heated with 1% by weight of the diglycidyl ether of bisphenol-A.

(B) 417 g. of tetrahydrofuran and 83 g. of propylene oxide were placed in a 1 liter flask equipped with stirrer and drying tube. The reactants were cooled to −20° C. and 26 ml. of (CF$_3$SO$_2$)$_2$O was added as catalyst. Cooling was discontinued and the reactants were stirred for 20 minutes. After this period a viscous solution of the di-cationically active copolymer was obtained. Polymerization was terminated by pouring the reactants into a mixture of 300 ml. of liquid NH$_3$ and 250 ml. of tetrahydrofuran maintained at −70° C. Volatile materials were then removed and the polymer was washed with dilute aqueous KOH to remove the catalyst residues. The final ω,ω'-copolyether diprimary diamine (200 g. yield) was a liquid at room temperature. Analysis of this material gave the following results: molecular weight=2637, percent nitrogen=1.16 (corresponding to 2.18 N's/molecule), total amines per molecule by perchloric acid titration: 2.24.

This copolyether diprimary diamine was cured by reaction with the diglycidyl ether of bisphenol-A. A rubbery vulcanizate was obtained which stiffened much more slowly with decreasing temperature than a comparable material made from a diprimary diamine of the homopolymer of tetrahydrofuran.

(C) 550 ml. of tetrahydrofuran was placed in a 1 liter flask equipped with stirrer and drying tube. 25 ml. of trifluoromethane sulfonic anhydride was added at room temperature with vigorous stirring and cold water cooling. About 4 minutes after the beginning of catalyst addition cooling was discontinued, and the somewhat viscous solution of the di-cationically active polymer was poured into a stirred mixture of about 500 ml. of liquid ammonia in 500 ml. of tetrahydrofuran maintained at about −70° C. Addition required about 2 minutes. The total reactant mass at this point was a cloudy white liquid. It was stirred for a short time at −70° C., and then allowed to warm to room temperature overnight. The polyether diprimary diamine formed was reprecipitated in water and washed repeatedly with aqueous base and water, then dried in vacuo at 60° C. The yield was 199.8 g. Analysis of the low melting wax product gave the following results: 0.904% nitrogen; number average molecular weight 3350, hence about 2.16 amine groups per molecule.

(D) 125 ml. of tetrahydrofuran and 6 ml. of trifluoromethane sulfonic anhydride were charged to a 250 ml. flask equipped with stirrer and drying tube. Four minutes after the catalyst addition the reactants had exhibited an exotherm and become somewhat viscous. 100 ml. of isobutyl amine was added rapidly to the di-cationically active product at this point, and the reactants were agitated overnight. The product was then reprecipitated in water, washed with hot aqueous potassium hydroxide and then washed with hot water until the wash water was neutral. The material was then dried several days in a vacuum oven at 60° C. Yield=55 grams. Analysis gave: 1.23% nitrogen and a number average molecular weight of 2180; hence 1.91 nitrogen atom per molecule in the form of secondary amine groups.

Such polymeric diamines are useuful for block copolymerization (e.g. condensation with a carboxyl-terminated polyester or polyamide). They also undergo chain extension and crosslinking reaction upon treatment with diisocyanates, epoxy resins, diaziridine compounds, various aminoplast resins (e.g. tetramethylol urea), etc. Products derived from polyether diamines have excellent water resistance, toughness and abrasion resistance and find great utility in the protective coating field.

(E) 2500 grams of tetrahydrofuran was distilled and condensed into a 5 liter flask through a column packed with molecular sieve material. The flask was equipped with a stirrer and drying tube. The tetrahydrofuran was cooled to −62° C. and 425 grams of (CF$_3$SO$_2$)$_2$O was added. The reactants were allowed to warm to 0° C. and maintained at that temperature for 15 minutes. The viscous solution of the di-cationically active polymer was rapidly poured into a stirred mixtuure of 858 grams of allyl amine and 500 ml. of methylene chloride maintained at −70° C. The combined solutions were allowed to warm to room temperature, and the volatile components were then removed. Upon dilution with benzene a significant quantity or precipitate formed, the precipitate having the formula

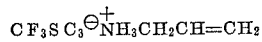

The precipitate was removed by filtration and could be used to recover the original catalyst. The benzene solution was then treated with a strongly basic ion exchange resin to remove the remaining traces of catalyst. After removal of solvent the polymer analyzed as follows: number average molecular weight=2800, secondary amine equivalent=1390 (indicating 2.01 secondary amine groups per molecule), 1.27% N (indicating 2.58 nitrogen atoms per molecule).

(F) 500 ml. of anhydrous tetrahydrofuran was placed in a one liter flask equipped with a stirrer and drying tube. The flask was cooled to −70° C., and 20 ml. of pyrosulfuryl fluoride was added. The reactants were allowed to warm to 0° C. and were maintained at that temperature for 10 to 12 minutes. The viscous solution of the di-cationically active polyether was poured rapidly into a stirred flask containing 300 ml. of ethyl amine at −70° C. After being allowed to warm overnight to room temperature with stirring the unreacted volatile materials were removed. Catalyst residues were removed by treatment with potassium hydroxide in methanol, followed by treatment in benzene solution with a strongly basic ion exchange resin. After drying, 165 grams of amine terminated polyether, identified as N,N'-diethyl poly-(tetramethylene oxide) diamine, was obtained. The number average molecular weight was 1550. Analysis: 1.77% N (indicating 1.96 nitrogen atoms per molecule) and 1.32 milliequivalents/gram of amine (indicating 2.05 amine groups per molecule).

(G) 400 ml. of anhydrous tetrahydrofuran was placed in a one liter flask, and 16 ml. of pyrosulfuryl fluoride was added at −57° C. The reactants were warmed with stirring to 0° C. and held there for 15 minutes. The temperature was then quickly lowered to −10° C. and polymerization was terminated by addition of 250 ml. of ethyl amine at a temperature of −70° C. Catalyst residues were then removed by filtration and treatment with a basic ion exchange resin. The yield of purified polyether disecondary amine was 110 grams. The number average molecular weight was 2700. Analysis: 1.09% N (indicating 2.1 nitrogen atoms per molecule), 1410 amine equivalent weight indicating 1.9 amine groups per molecule). This diamine product may be used to cure epoxy resins to a hard, very impact resistant state.

The following materials were placed in a 500 ml. flask equipped with a stirrer: 15.5 grams of this polyether disecondary diamine, 1.14 grams of trans-2,5-dimethyl piperazine, and 207 grams of dimethyl formamide. 4.8 grams of methylene-bis-(4-phenylisocyanate) in a solvent mixture consisting of 33 grams of dimethyl formamide and 66 grams of xylene was added dropwise to the stirred amine solution at room temperature. A significant viscosity increase was observed. Films were cast from this solution after completion of the chain extension reaction. The resulting snappy elastomer had a tensile strength of 4060 pounds per square inch at 525% ultimate elongation. Elastic fibers having good properties may be wet spun from a 15% solution of this product in dimethyl formamide.

EXAMPLE 3

This example shows the preparation of a di-cationically active polyether and its use in preparing the corresponding polyether dithiol and products derived therefrom.

20 ml. of purified tetrahydrofuran was placed in a 250 ml. round bottom flask equipped with stirrer. At about −40° C. 3 ml. of trifluoromethane sulfonic anhydride was added, and the reactants were allowed to warm to room temperature and polymerize with stirring. Within about one hour a thick paste had formed. To this di-cationically active polymer was added 100 ml. of anhydrous pyridine saturated with hydrogen sulfide, and with continued stirring additional hydrogen sulfide was intermittently bubbled in using a glass filter tube until the polymer dissolved in the pyridine (several days). The resulting product was reprecipitated in water, washed with water and dried overnight in the vacuum oven at 50° C.

The yield of tough, light colored, solid polymer was 9.7 g. The infrared spectrum showed absorption in the C—S bond (14.6 microns) region. The product gave an inherent viscosity of 1.19 in benzene at 25° C., which corresponds to an approximate molecular weight of 100,000. Elemental analysis gave 0.46% S, corresponding to 14 sulfur atoms per molecule. Some chain extension had occurred via the formation of thioether linkages and the terminal groups were thiols. Chain extension and the accompanying molecular weight increase may be minimized by quenching the tetrahydrofuran polymer in liquid hydrogen sulfide.

Such polymeric dithiols, including polysulfide thiols, are readily cured by reaction with ethylenically diunsaturated compounds (e.g. ethylene dimethacrylate), active polyhalides (e.g. ethylene dibromide; 1,2,3-tribromopropane), poly-isocyanates and certain oxidizing agents such as barium peroxide. Block copolymers are produced by the free radical polymerization of ethylenically unsaturated monomers in the presence of the polymeric dithiols. The latter reaction is illustrated below.

Using the polyether dithiol made above, the following charges were made in amopules:

(1)

9.5 g. styrene
0.5 g. polyether dithiol
20 g. benzene
30 mg. azobisisobutylronitrile (2)

7.5 g. styrene
2.5 g. polyether dithiol
20 g. benzene
30 mg. azobisisobutyronitrile (3)

5 g. styrene
5 g. polyether dithiol
30 g. benzene
30 mg. azobisisobutyronitrile (4)

10 g. styrene
20 g. benzene
30 mg. azobisisobutyronitrile

These amopules were agitated at 50° C. for 5 days. The resulting block copolymers and the homopolymer control were reprecipitated in heptane and dried. Yields (1) 6.2 g., (2) 4.8 g., (3) 6.7 g., and (4) 4.6 g. Infrared spectra were obtained, and these showed the presence of both poly-styrene and polyether units in the products of ampoules 1, 2 and 3, with the proportion of polyether increasing in that order. Ten weight percent solutions of each homopolymer in benzene were mixed, and two distinct liquid phases formed in the mixture on standing for a few hours. No such phasing was observed for 10% solutions in benzene of the block copolymeric products 1, 2 and 3 above, even after much longer periods of time. The flexibility and impact strength of the block copolymer increases appreciably with increasing polyether content. Such block copolymers find use in coatings, binders, adhesives and the manufacture of plastic parts.

EXAMPLE 4

This example shows the preparation of a di-cationically active polyether and its use in preparing a polyether dicarboxylic acid.

100 ml. of anhydrous tetrahydrofuran and 10 ml. of freshly distilled trifluoromethane sulfonic anhydride were placed at room temperature in a 250 ml. flask equipped with a stirrer and drying tube. The reaction was exothermic and a cold water bath was used to modify the exotherm. After a few minutes the reaction mixture became quite viscous, and 100 ml. of tetrahydrofuran containing 20 g. of succinic acid as a slurry was added to the di-cationically active polyether. The solution was agitated at room temperature for several hours and then poured into dilute aqueous ammonium hydroxide, which produced a cloudy solution but no coagulation. Addition of a small amount of concentrated HCl precipitated the polymer. The polymer was then washed with water and twice reprecipitated from tetrahydrofuran into water. The product was then washed four times with hot water and dried in the vacuum oven at 50° C. Yield: 49 g. Analysis: Number average molecular weight=3300; carboxyl neutralization equivalent=1640. This data gives 2.01 COOH groups per molecule of polymer in which the terminal carboxylic acid groups are attached to the polyether chain through ester linkages. The brittle waxy product was quite surface active in aqueous alkaline solutions. It may be used to form block copolymers by condensation with hydroxyl-terminated polyethers or polyesters or with amine terminated polyamides. It may also be cured to a rubbery state by reaction with polyepoxides or polyaziridines.

EXAMPLE 5

This example illustrates the use of di-cationically active polyethers prepared by the direct method to initiate a subsequent polymerization, thereby producing block copolymers.

(A) 10 ml. of tetrahydrofuran and 0.5 ml. of trifluoromethane sulfonic anhydride were sealed into a glass ampoule. After room temperature agitation overnight, the product containing a di-cationically active polymer of tetrahydrofuran was non-flowing. The ampoule was opened, cooled in liquid air and 10 ml. of ethylene oxide was then added, and the ampoule was resealed. After vigorous overnight shaking at room temperature a homogeneous clear solution resulted. Then during mild agitation for several days the viscosity was observed to increase. Agitation was continued until the reactants suddenly turned black. The product was then immediately quenched in dilute aqueous sodium hydroxide for 70 hours, and then washed with water (containing some sodium bromide to prevent dissolution of the polymer).

After drying at 50° C. overnight in a vacuum oven, a viscous liquid, dark red polymer (7 g.) was obtained. Its block copolymeric nature was indicated by infrared analysis and also by the surface activity of the product and the fact that it exhibited a cloud point in water. Stable emulsions of benzene in water could be produced by shaking benzene in a 1% aqueous solution of the product.

(B) 10 ml. of tetrahydrofuran and 0.5 ml. of trifluoromethane sulfonic anhydride were allowed to react in a glass ampoule at 25° C. After 24 hours the ampoule was opened and 10 ml. of distilled styrene was added to the solid reaction product. The ampoule was resealed and vigorously shaken for 72 hours. At this pont the reactants were in the form of a clear, homogeneous, viscous solution. The material was then quenched in dilute ammonium hydroxide for 24 hours.

The dried polymer (9 g.) was a low melting solid. Infrared spectroscopy clearly indicated the presence of units of both monomers, and no OH absorption. Clear films were cast from a solution of this block copolymeric product.

EXAMPLE 6

This example illustrates the use of di-cationically active polymers in the alkylation of anions of appropriate salts.

(A) 330 grams of anhydrous tetrahydrofuran was placed in a 3 neck flask with stirrer. The flask and charge were cooled in an ice bath, and 47.4 grams of trifluoromethane sulfonic anhydride was added. After the initial exotherm was dissipated the ice bath was removed. After about 45 minutes the reactants had become noticeably more viscous. At this point a solution of 70 g. of sodium phenoxide in 500 ml. tetrahydrofuran was added.

The resulting polymer was coagulated in water, washed a number of times with hot ammonium hydroxide and then with hot water. The polymer was dried 24 hours at 80° C. in a vacuum oven. The number average molecular weight of the polyether was 974. Yield=223 g. Infrared analysis confirmed the presence of phenoxy groups, and showed no absorption for free phenol or OH. When heated in air to 310° C. at a constant rate of 10° per minute, only a 10% weight loss was observed, indicating the outstanding thermal stability of the di-phenoxy terminated polytetramethylene oxide.

(B) 100 ml. of anhydrous tetrahydrofuran was placed in a 250 ml. round bottom flask equipped with a stirrer and drying tube. Ten milliliters of trifluoromethane sulfonic anhydride was added at room temperature. An exotherm and viscosity increase were noted. A few minutes after anhydride addition 26 g. of potassium cyanate was added to the di-cationically active polymer. Vigorous stirring was maintained at room temperature over a weekend. During the latter part of this period, however, the reactants gelled. The product was then shaken with benzene, and a soluble and an insoluble portion were found. Both portions exhibited fairly strong alkyl isocyanate absorption bands in the infrared (4.4 microns; potassium cyanate absorbs at 4.6 microns). The soluble material was rendered insoluble by almost instantaneous reaction at 25° C. with hexamethylene diamine, and the resulting insoluble material showed no isocyanate absorption in the infrared, indicating complete formation of the urea.

EXAMPLE 7

This example describes the use of a diester catalyst which is effective in the preparation of di-cationically active polymers.

8 milliliters of trifluoromethane sulfonic acid anhydride was charged to a test tube and cooled to −60° C. 4 ml. of tetrahydrofuran was then dropwise over a five minute period. A solid formed immediately. The temperature was allowed to rise to 0° C. and 25 ml. of cold carbon tetrachloride was added. After thorough mixing, the liquid was decanted and discarded. The solid remaining was dissolved in 150 ml. of boiling carbon tetrachloride and recrystallized by cooling with ice. The crystals were washed thoroughly with 60 ml. of cold water and again recrystallized from hot carbon tetrachloride. Yield=8.4 g. of white crystals, M.P. 36° C. The NMR and IR spectra indicated that the compound was $$CF_3SO_2-O-(CH_2)_4-O-SO_2CF_3$$

Elementary analysis showed 32.5% F, 20.1% C, and 2.7% H. Theoretical values are 32.2% F, 20.3% C and 2.3% H.

72 g. of tetrahydrofuran, distilled over $LiAlH_4$, was charged to a 125 ml. 3 neck round bottomed flask equipped with a stirrer and placed in an ice bath. 5.30 g. of tetramethylene bis(trifluoromethane sulfonate) was then added and the polymerization carried out at 0° C. for 60 minutes. The flask was completely closed to the atmosphere. The di-cationically active polyether formed was then poured into an agitated solution of 40 ml. ethyl amine in 250 ml. of tetrahydrofuran at −60° C. After stirring for 5 minutes, the excess amine was removed by vacuum stripping. 30 g. of ion exchange resin, IRA-402 (Rohm & Haas), was added and the mixture was stirred for 18 hours at 25° C. The ion exchange resin was then removed by filtration and the solvent removed by vacuum stripping at 75° C. Yield of polyether disecondary diamine was approximately 20%. $\overline{M}n=5760$; amine equivalent weight= 1960. Amine groups per molecule=2.9.

EXAMPLE 8

This example describes the determination of the terminating or non-terminating character of a series of anions.

Standard polymerization conditions were established as follows: 115 ml. of anhydrous tetrahydrofuran containing a soluble salt was placed in a 250 ml. flask equipped with thermometer, stirrer and drying tube. The temperature was lowered to −50° C. and 5 ml. of redistilled $(CF_3SO_2)_2O$ was added. The amount of salt employed was equimolar with $(CF_3SO_2)_2O$, i.e. sufficient to reduce the functionality of the resulting poly(tetramethylene oxide) to as low as 1 if it were a terminating anion and sufficient to reduce markedly the molecular weight of said polymer. The temperature of the tetrahydrofuran solution was allowed to warm to 0° C. (requiring 7 minutes) and held there for 10 minutes. Termination of polymerization was effected by addition of excess LiBr dissolved in tetrahydrofuran; this termination reaction served to append a Br atom to every cationic site persisting in the polymer solution. Thus determination of the molecular weight and percent of Br of the final polymer is indicative of the functionality of the polymer. The results for the purified polymeric products are shown in Table I:

TABLE I

| Salt | Yield of polymer, percent | Molecular weight of polymer | Percent Br | Functionality of polymer |
|---|---|---|---|---|
| $AgO_3SCF_3$ | 31 | 1,885 | 9.69 | Di-functional. |
| $AgClO_4$ | 33 | 1,510 | 11.24 | Do. |
| $AgSbF_6$ | 41 | 2,300 | 7.52 | Do. |
| $AgBF_4$ | 33 | 1,314 | 12.58 | Do. |
| $LiPF_6$ | 43 | 1,282 | 11.90 | Do. |
| $LiClO_4$ | 32 | 1,800 | 10.50 | Do. |
| $LiMnO_4$ | 9 | 1,022 | 7.43 | Mono-functional. |
| $LiNO_3$ | 11 | 854 | 11.80 | Do. |
| LiBr | 2 | 433 | ---- | ([1]). |

[1] Functionality could not be determined directly, but from the known terminating ability of the Br ion, as well as the vastly reduced molecular weight and yield, the monofunctionality of the polymer can readily be deduced.

It has been shown here that, of the ions tested, $CF_3SO_3^\ominus$, $ClO_4^\ominus$, $SbCl_6^\ominus$, $BF_4^\ominus$, and $PF_6^\ominus$ are non-terminating, and that $MnO_4^\ominus$, $NO_3^\ominus$ and $Br^\ominus$ are terminating. Thus, in the class of catalysts capable of producing di-cationically active polymers, which is represented by the formula DQ, this example shows that Q may be any of the radicals $CF_3SO_3-$, $ClO_4-$, $SbCl_6-$, $BF_4-$ or $PF_6-$ since these radicals do not cause termination of tetrahydrofuran polymerization when present in their anionic form. Q, however, may not be either of the radicals $MnO_4-$, $NO_3-$ or $Br-$, since these radicals are shown to cause the termination of tetrahydrofuran polymerization, when present in their anionic form.

EXAMPLE 9

This example describes the preparation of a complex salt and its use in converting tetrahydrofuran into a di-cationically active polymer.

4.6 g. of $CF_3SO_2F$ and 1.3 ml. of $SbF_5$ were reacted in a sealed glass ampoule at room temperature. The $CF_3SO_2F$ was used in excess here to act both as reactant and solvent. A crystalline light amber colored product resulted from the reaction. Excess of $CF_3SO_2F$ was removed under vacuum. The resulting salt, which may be represented by the formula $CF_3SO_2^+SbF_6^-$, was then used to polymerize tetrahydrofuran as follows:

100 ml. of tetrahydrofuran was distilled from $LiAlH_4$ into a 200 ml. flask equipped with stirrer and thermometer. 3.7 g. of the above salt was added to the tetrahydrofuran at 22° C. At the end of 4.7 minutes the temperature had risen to 44° C. and was still rising, and the solution had become viscous. The reaction was terminated by the addition of 13 g. of LiBr, which served to attach Br atoms to all cationically active sites in the polymer solution. After removal of unreacted tetrahydrofuran the polymer was purified by extracting it with cyclohexane. The yield of purified polymer was 27%. Its molecular weight was 9570. Bromine analysis (2.07%) showed it to bear bromine atoms at each end of the polyether chain, thus clearly demonstrating the ability of this complex salt to convert tetrahydrofuran to a di-cationically active polymer.

Examples 10–12 pertain to the indirect method for making di-cationically active polymers from appropriate prepolymers.

EXAMPLE 10

This example illustrates the conversion of an omega, omega'-polyether glycol into a di-cationically active polymer and the subsequent conversion of this product into an omega,omega'-polyether disecondary diamine.

The following were placed into a 1 liter flask equipped with stirrer and drying tube: 200 grams of poly(tetramethylene oxide) glycol (molecular weight=2700) and 600 ml. of methylene chloride. This solution was cooled to −40° C. and 50 ml. of $(CF_3SO_2)_2O$ was added. The reactants were stirred for 2½ hours at a temperature of −30° C. to −40° C. During this period the glycol was converted to a di-cationically active product. The solution was then rapidly poured into a mixture of 300 ml. of ethyl amine and 300 ml. of toluene maintained at −70° C. The combined solutions were allowed to warm to room temperature with overnight agitation. The volatile materials were removed, and the polymer was taken up in benzene, filtered, treated with a strongly basic ion exchange resin to remove catalyst residues, and dried. Analysis of the resulting polymer was as follows: number average molecular weight equals 2000; amine equivalent weight=981 (indicating 2.04 secondary amine groups per molecule); 1.59% N (indicating 2.27 nitrogen atoms per molecule).

EXAMPLE 11

1314 g. of adipic acid, 874 g. of 1,4-butanediol and 1 g. of tetrabutyl tin were heated with agitation at 200–210° C. for 7 hours. The water of reaction was removed by azeotroping with heptane. 339 g. of water were collected during the 7 hours reaction period. The solvent and unreacted 1,4-butanediol were removed by vacuum stripping. Analysis of the polyester indicated an acid number of less than one and a hydroxyl equivalent weight of 1970.

4.9 ml. of $(CF_3SO_2)_2O$, freshly distilled over $P_2O_5$, and 100 ml. of anhydrous dichloromethane were charged to a 3 neck, 250 ml. round bottom flask equipped with stirrer, thermometer and dropping funnel. The temperature of the solution was lowered to −20° C., and a solution of 39.4 g. of the butanediol adipate polyester prepared above and 2.4 ml. of pyridine in 100 ml. of dichloromethane were added at −20° C. over a two hour period. The temperature of the mixture was then lowered to −50° C. and the solid pyridinium trifluoromethane sulfonate salt removed by filtration. The filtrate containing the di-cationically active polyester was poured into an agitated solution of 25 g. of LiBr in 500 ml. tetrahydrofuran and stirred for 1 hour at room temperature. After washing the solution with 750 ml. of 5% KOH solution and 200 ml. of water and drying it with $MgSO_4$, the solvent was removed by vacuum stripping at 70° C. The polymer was then extracted with boiling cyclohexane and the clear cyclohexane layer discarded. The residue was dissolved in 150 ml. of toluene, dried with anhydrous $MgSO_4$, and centrifuged. The solvent was then removed by vacuum stripping at 80° C. The infrared spectrum of the polymer (20 g. recovered yield) was devoid of any hydroxyl group absorption peak. Analysis showed 4.09% bromine. The theoretical bromine content, assuming two bromine end groups per molecule, is 3.94%.

EXAMPLE 12

3.5 ml. of $(CF_3SO_2)_2O$, freshly distilled over $P_2O_5$, and 100 ml. of dichloromethane were charged to a 3 neck, 250 ml. round bottom flask equipped with stirrer, dropping funnel and thermometer. The temperature of the agitated solution was lowered to −20° C., and a solution of 39.4 g. of the butanediol adipate polyester (prepared in Example 11) and 1.7 ml. of pyridine in 100 ml. of dichloromethane was added dropwise at −20° C. over a two hour period. The temperature of the mixture was lowered to −60° C. and the solid pyridinium trifluoromethane sulfonate salt removed by filtration. The filtrate containing the di-cationically active polyester was added to 130 g. off freshly distilled tetrahydrofuran in a 500 ml., 2 neck round bottom flask equipped with a stirrer and a vacuum outlet tube. The temperature was allowed to rise to 25° C. and a vacuum was applied until the dichloromethane was removed. Polymerization was continued for 3 hours at 25° C. and then terminated by pouring the contents into a solution of 10 g. LiBr dissolved in 500 ml. of tetrahydrofuran. After washing this solution with 400 ml. of 5% KOH, then with 200 ml. of water and drying it with anhydrous $MgSO_4$, the solvent was removed by vacuum stripping at 70° C. The polymer (50 g. recovered yield) was a viscous liquid at 70° C. and was completely soluble at 25° C. in cyclohexane, a non-solvent for the polyester itself. Infrared analysis showed the presence of both ester and ether linkages and the absence of any hydroxyl groups. All evidence indicated that the product was a block copolymer containing central segments of polyester joined to polyether segments having terminal bromine groups.

EXAMPLE 13

This example describes the preparation of another di-ester catalyst which is effective in the preparation of di-cationically active polymers.

56.4 grams (0.2 mole) of trifluoromethanesulfonic anhydride was charged to a 500 ml. flask together with 100 ml. of methylene chloride, and the mixture was cooled to 0° C. A mixture of 6.2 grams (0.1 mole) of ethylene glycol and 15.8 grams (0.2 mole) of pyridine in 150 ml. of methylene chloride was added slowly with stirring from a separatory funnel over a period of 2½ hours. The mixture was then stirred for 30 minutes at 20° C. The precipitated pyridine acid salt was quickly filtered off, and the filtrate in a stoppered flask was placed in a dry ice bath for 24 hours. The precipitate formed was filtered off and discarded. A 200 ml. portion of the filtrate was placed in a rotary film evaporator and the solvent was removed under vacuum at a temperature slightly below 30° C. The residue was distilled and a water white fraction (6.1 grams) was collected at 30–32° C. and approximately 1 micron pressure. A second fraction having a light brown color (0.8 g.) was obtained at a higher temperature. The water white fraction is identified as the diester product, the reaction leading to the resulting diester being represented as $2(CF_3SO_2)_2O + HOCH_2CH_2OH + 2C_5H_5N \longrightarrow$
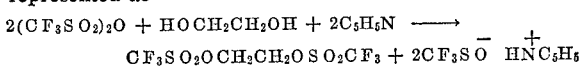

Various other embodiments of the present invention and additional uses therefore will be apparent to those skilled in the art without departing from the scope or spirit of this disclosure.

The embodiments of the invention in which an exclusive property or privilege is claimed are defined as follows:

1. A process for preparing a block copolymer which comprises reacting a cationically polymerizable monomer with a polymer of a tetrahydrofuran which is free of alkylatable groups, which is cationically active at at least two ends, each of which ends having bonded thereto only a radical which:
    (1) in anionic form is a non-terminating anion when 2 mol percent of a dissolved salt containing said anion is present during the polymerization of 99 mol percent tetrahydrofuran and 1 mol percent ethylene oxide with 2 mol percent of boron trifluoride as polymerization initiator at 20° C. to provide at least about 50 percent conversion of said monomers to polymer, and
    (2) is an anion of a protonic acid stronger than 100% sulfuric acid, said poly-cationic activity being characterized by said polymer's ability (a) to react with at least a two-fold molar excess of ammonia at a temperature below about 25° C. to produce a polymeric polyprimary amine or polyamide in which the amine or amide groups are in the terminal positions, and (b) to initiate the polymerization of tetrahydrofuran monomer at 25° C.

2. The process of claim 1 in which said cationically polymerizable monomer is tetrahydrofuran.

3. The process of claim 1 in which said cationically polymerizable monomer is ethylene oxide.

4. The process of claim 1 in which said cationically polymerizable monomer is styrene.

5. The process of claim 1 in which said polymer contains recurring oxytetramethylene groups.

6. A process for preparing a block copolymer which comprises reacting styrene with a polycationically active polytetrahydrofuran having $CF_3SO_3$ radicals bonded to each end thereof.

References Cited

UNITED STATES PATENTS

| | | | |
|---|---|---|---|
| 2,991,269 | 7/1961 | Nozaki | 260—874 |
| 3,050,511 | 8/1962 | Szware | 260—874 |

FOREIGN PATENTS

| | | | |
|---|---|---|---|
| 898,269 | 4/1945 | France | 260—2 D |

OTHER REFERENCES

K. Hamann Angew: Chem. 63, 231–240 (1951).

PAUL LIEBERMAN, Primary Examiner

U.S. Cl. X.R.

260—2 D, 47 EN, 77.5 AP, 823, 830 R, 838, 849, 857 PEO, 860, 874

UNITED STATES PATENT OFFICE
CERTIFICATE OF CORRECTION

Patent No. 3,644,567     Dated February 22, 1972

Inventor(s) SAMUEL SMITH and ALLEN J. HUBIN

It is certified that error appears in the above-identified patent and that said Letters Patent are hereby corrected as shown below:

Column 1, line 55, "Szware" should be --Szwarc--;

Column 1, line 57, "contaminated" should be --nonterminated--;

Column 1, line 64, "distinct" should be --distinction--;

Column 4, line 69, "ae" should be --are--;

Column 6, line 2, "fluoosulfonic" should be --fluorosulfonic--;

Column 9, line 8, "-8°C." should be -- -80°C.--;

Column 12, line 39, "diluent" should be --dilute--;

Column 14, line 4, "wahed" should be --washed--;

Column 14, line 35, "$CF_3SC_3^{\ominus} \overset{+}{N}H_3CH_2CH=CH_2$" should be --$CF_3SO_3^{\ominus} \overset{\oplus}{N}H_3CH_2CH=CH_2$--;

Column 15, line 47, "therminal" should be --terminal--;

Column 15, line 69, "azobisisobutylronitrile" should be --azobisisobutyronitrile--;

Column 17, line 18 "pont" should be --point--.

Signed and sealed this 12th day of December 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,644,567  Dated February 22, 1972

Inventor(s) SAMUEL SMITH and ALLEN J. HUBIN

It is certified that error appears in the above-identified patent and that said Letters Patent are hereby corrected as shown below:

Column 1, line 30, after "Ser. No. 527,399 filed on Feb. 10, 1966" please insert -

-- , which is a continuation-in-part application of U. S. patent application Serial No. 290,218, filed on June 24, 1963, now abandoned. --

Signed and Sealed this twenty-third Day of September 1975

[SEAL]

Attest:

RUTH C. MASON
Attesting Officer

C. MARSHALL DANN
Commissioner of Patents and Trademarks